United States Patent
Daniels et al.

(10) Patent No.: US 10,834,659 B2
(45) Date of Patent: Nov. 10, 2020

(54) LINK AGGREGATION FOR MESH NETWORKS

(71) Applicant: Phazr, Inc., Allen, TX (US)

(72) Inventors: Robert Clark Daniels, Round Rock, TX (US); Farooq Khan, Allen, TX (US); Pravir Patel, Plano, TX (US)

(73) Assignee: Phazr, Inc., Allen, TX (US)

( * ) Notice: Subject to any disclaimer, the term of this patent is extended or adjusted under 35 U.S.C. 154(b) by 0 days.

(21) Appl. No.: 16/292,159

(22) Filed: Mar. 4, 2019

(65) Prior Publication Data

US 2019/0274084 A1    Sep. 5, 2019

Related U.S. Application Data

(60) Provisional application No. 62/638,926, filed on Mar. 5, 2018.

(51) Int. Cl.
| | |
|---|---|
| *H04W 40/16* | (2009.01) |
| *H04W 28/16* | (2009.01) |
| *H04W 24/10* | (2009.01) |
| *H04W 40/24* | (2009.01) |
| *H04W 40/30* | (2009.01) |
| *H04W 28/02* | (2009.01) |
| *H04W 84/18* | (2009.01) |

(52) U.S. Cl.
CPC ........... *H04W 40/16* (2013.01); *H04W 24/10* (2013.01); *H04W 28/0268* (2013.01); *H04W 28/16* (2013.01); *H04W 40/246* (2013.01); *H04W 40/30* (2013.01); *H04W 84/18* (2013.01)

(58) Field of Classification Search
CPC . H04W 40/16; H04W 28/0268; H04W 40/30; H04W 40/246; H04W 24/10; H04W 28/16; H04W 84/18; H04W 40/12; H04W 28/02
See application file for complete search history.

(56) References Cited

U.S. PATENT DOCUMENTS

| | | | |
|---|---|---|---|
| 9,419,887 B1 * | 8/2016 | Kabbani | H04L 45/125 |
| 10,362,526 B2 * | 7/2019 | Gokturk | H04W 48/18 |
| 2007/0127417 A1 * | 6/2007 | Kalika | H04W 8/005 |
| | | | 370/338 |
| 2007/0206537 A1 * | 9/2007 | Cam-Winget | H04L 63/162 |
| | | | 370/331 |

(Continued)

*Primary Examiner* — Jay P Patel
(74) *Attorney, Agent, or Firm* — Michael A. Rahman

(57) ABSTRACT

A method for determining a route from a mesh network to an external network includes identifying route segments from a user equipment (UE) to the external network. The route segments comprise at least a first route segment from the UE to a first mesh access point (AP), a second route segment from the first mesh AP to the external network through a wide area cellular wireless network (WACWN), and a third route segment from the first mesh AP to the external network through an alternative network. The method further includes determining respective bandwidth of at least the first, second and third route segments and selecting the route based on the bandwidth of the first, second and third route segments, wherein the route comprises at least two of the route segments. The method also includes routing data between the UE and the external network via the selected route.

19 Claims, 10 Drawing Sheets

(56) References Cited

U.S. PATENT DOCUMENTS

| | | | |
|---|---|---|---|
| 2009/0232026 A1* | 9/2009 | Lu | H04L 45/125 |
| | | | 370/254 |
| 2010/0260146 A1* | 10/2010 | Lu | H04L 12/4633 |
| | | | 370/331 |
| 2014/0301241 A1* | 10/2014 | Kumar | H04L 49/109 |
| | | | 370/254 |
| 2016/0241353 A1* | 8/2016 | Wright | H04J 14/0256 |
| 2017/0055199 A1* | 2/2017 | Petersen | H04W 40/28 |
| 2017/0078186 A1* | 3/2017 | Thyni | H04L 45/124 |
| 2017/0078922 A1* | 3/2017 | Raleigh | H04W 28/10 |
| 2017/0188266 A1* | 6/2017 | Tian | H04W 28/0231 |
| 2018/0343685 A1* | 11/2018 | Hart | H04W 76/15 |
| 2019/0089777 A1* | 3/2019 | Linsky | H04L 63/0815 |
| 2019/0289473 A1* | 9/2019 | Gokturk | H04W 16/20 |

* cited by examiner

LINK AGGREGATION FOR MESH NETWORKS

CROSS-REFERENCE TO RELATED APPLICATION

This application claims priority to U.S. Provisional Patent Application No. 62/638,926 entitled "MESH EXTENSION OF WIDE AREA NETWORKS," filed Mar. 5, 2018, the disclosure of which is herein incorporated by reference in its entirety.

BACKGROUND

The invention relates to wireless communications, and in particular relates to link aggregation for mesh networks.

DESCRIPTION OF THE RELATED ART

Currently, wireless access methods are based on two popular standards: a wide area network (WAN) standard referred to as The Fourth Generation Long Term Evolution (4G LTE) system; and a local area network (LAN) standard called Wi-Fi. Wi-Fi is generally used indoors as a short-range wireless extension of wired broadband systems, whereas the 4G LTE systems provide wide area long-range connectivity both outdoors and indoors using dedicated infrastructure such as cell towers and backhaul to connect to the Internet.

As more people connect to the Internet, increasingly chat with friends and family, watch and upload videos, listen to streamed music, and indulge in virtual or augmented reality, data traffic continues to grow exponentially. In order to address the continuously growing wireless capacity challenge, the next generation of LAN and WAN systems are relying on higher frequencies referred to as millimeter waves in addition to currently used frequency bands below 7 GHz. The next generation of wireless WAN standard referred to as 5G New Radio (NR) is under development in the Third Generation Partnership Project (3GPP). The 3GPP NR standard supports both sub-7 GHz frequencies as well as millimeter wave bands above 24 GHz. In 3GPP standard, frequency range 1 (FR1) covers frequencies in the 0.4 GHz-6 GHz range. Frequency range 2 (FR2) covers frequencies in the 24.25 GHz-52.6 GHz range. Table 1 provides examples of millimeter wave bands including FR2 bands that may be used for wireless high data-rate communications. In the millimeter wave bands above 24 GHz, a time division duplexing (TDD) scheme is generally preferred. However, regulations in most parts of the World allow using other duplexing schemes including frequency division duplexing (FDD). Table 1. below lists examples of millimeter wave bands.

| Bands [GHz] | Frequency [GHz] | Bandwidth [GHz] |
|---|---|---|
| 26 GHz Band | 24.25-27.5 | 3.250 |
| LMDS Band | 27.5-28.35 | 0.850 |
|  | 29.1-29.25 | 0.150 |
|  | 31-31.3 | 0.300 |
| 32 GHz Band | 31.8-33.4 | 1.600 |
| 39 GHz Band | 38.6-40 | 1.400 |
| 37/42 GHz Bands | 37.0-38.6 | 1.600 |
|  | 42.0-42.5 | 0.500 |
| 47 GHz | 47.2-48.2 | 1.000 |
| 60 GHz | 57-64 | 7.000 |
|  | 64-71 | 7.000 |
| 70/80 GHz | 71-76 | 5.000 |
|  | 81-86 | 5.000 |
| 90 GHz | 92-94 | 2.900 |
|  | 94.1-95.0 |  |
| 95 GHz | 95-100 | 5.000 |
| 105 GHz | 102-105 | 7.500 |
|  | 105-109.5 |  |
| 112 GHz | 111.8-114.25 | 2.450 |
| 122 GHz | 122.25-123 | 0.750 |
| 130 GHz | 130-134 | 4.000 |
| 140 GHz | 141-148.5 | 7.500 |
| 150/160 GHz | 151.5-155.5 | 12.50 |
|  | 155.5-158.5 |  |
|  | 158.5-164 |  |

Table 2 lists examples of FR1 bands in the 3GPP standard. We refer to the FR1 bands in the 3GPP standard, unlicensed 2.4 GHz and 5 GHz bands, 5.925-6.425 GHz and 6.425-7.125 GHz bands and any other spectrum band below 7 GHz as sub-7 GHz spectrum. The duplexing schemes used in the sub-7 GHz spectrum, among others, can be time division duplexing (TDD), frequency division duplexing (FDD), supplemental downlink (SDL) or supplemental uplink (SUL).

TABLE 2

Examples of FR1 bands in 3GPP

| 5G-RAN Frequency Band | Uplink Frequency band | Downlink Frequency band | Duplex Mode |
|---|---|---|---|
| n1 | 1920 MHz-1980 MHz | 2110 MHz-2170 MHz | FDD |
| n3 | 1710 MHz-1785 MHz | 1805 MHz-1880 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n41 | 2496 MHz-2690 MHz | 2496 MHz-2690 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n77 | 3300 MHz-4200 MHz | N/A | TDD |
| n78 | 3300 MHz-3800 MHz | N/A | TDD |
| n79 | 4400 MHz-5000 MHz | N/A | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |

In addition to serving mobile devices, the next generation of wireless WAN systems using millimeter wave and sub-7 GHz spectrum is expected to provide high-speed (Gigabits per second) links to fixed wireless broadband routers installed in homes and commercial buildings.

As mentioned, a wireless LAN (WLAN or Wi-Fi) is typically used indoors as a short-range wireless extension of wired broadband systems. A WLAN enables wireless networking functionality between an access point (AP) and one or more user equipment (UEs). Hereinafter, UEs and STAs are used interchangeably. A UE may access an external wide area network such as the Internet via an AP through wireless means.

FIG. 1 conceptually illustrates a WLAN 100 which can be deployed in a home, office, airport or store, for example. The WLAN 100 includes an AP 104 and a plurality of UEs 108A-108C. The UEs 108A-108C communicate with the AP 104 through wireless means. The AP 104 is connected to an external network such as the Internet 112. The AP 104 provides external network access to the UEs 108A-108C through wireless means.

One limitation of the traditional WLAN is that means are not provided to network together multiple APs and to allow UEs to connect to multiple APs simultaneously. A further limitation of the traditional WLAN is that means are not provided to allow to network together UEs that are not connected to the same AP. As a result, coverage of traditional WLAN deployments is often unsatisfactory.

To overcome coverage limitation of the traditional WLAN, mesh networks have been deployed as an extension of wide area wireless networks. The mesh networks can be deployed in an office, a home, a store or an airport, for example.

FIG. 2 conceptually illustrates a mesh network 200. The dashed lines represent mesh backhaul connections and solid, double arrow lines represent AP to UE (i.e., AP to STA) connections. The mesh network 200 is enabled through AP to AP communication, and relies on cable modem as a backhaul.

FIG. 3 conceptually illustrates a mesh network 300 which is enabled through UE to UE (i.e., STA to STA) communication. The mesh network 300 also relies on cable modem as a backhaul.

When a mesh network is installed in a building, mesh wireless coverage may extend outside and to the immediate adjacent area of the building. If adjacent buildings in an area or neighborhood have active mesh networks, the coverage regions may overlap.

FIG. 4A illustrates overlapping mesh coverage which causes interference. Referring to FIG. 4A, a base station 404 (also referred to as Fixed Wireless Access (FWA)) provides wireless coverage in an area represented by a circle 408. Buildings represented by hashed squares have mesh networks that provide mesh coverage in regions represented by dotted lines. Due to overlapping mesh coverage, several regions are subject to interference.

Recent innovations in multipath transport control protocol have enabled link aggregation of multiple external network connections. By aggregating multiple network connections, user data may be routed over one or more networks. Thus, a user may transmit and receive data over one or more networks depending on network traffic congestion. Link aggregation has also been used in mesh networks to enable UEs to access multiple external networks. An exemplary link aggregation in a mesh network is conceptually illustrated in FIG. 4B where a Wide Area Cellular Wireless Network (WACWN) connection through a customer premise equipment (CPE) 440 and a cable network connection through a cable modem 444 are aggregated for a mesh network by a module 448. A mesh AP 452A is connected to the module 448 by a wired connection. The mesh AP 452A is also connected to mesh APs 452B, 452C and 452D through wireless means. The module 448 routes data from the WACWN and the cable network to UEs 456A-456F in the mesh network. Transmitted data from the UEs 456A-456F is routed either to the WACWN or the cable network by the module 448. Further improvements in link aggregation for mesh networks is desired.

SUMMARY

Various aspects of the present disclosure are directed to methods for determining a route from a mesh network to an external network. In one aspect, a method includes identifying a plurality of route segments from a user equipment (UE) to the external network. The route segments comprise at least a first route segment from the UE to a first mesh access point (AP), a second route segment from the first mesh AP to the external network through a wide area cellular wireless network (WACWN), and a third route segment from the first mesh AP to the external network through an alternative network. The method further includes determining respective bandwidth of at least the first, second and third route segments and selecting the route based on the bandwidth of the first, second and third route segments, wherein the route comprises at least two of the route segments. The method also includes routing data between the UE and the external network via the selected route. The method also includes determining physical layer bandwidth of at least the first, second and third route segments, and selecting the route which has the maximum bandwidth from the UE to the external network, wherein the route comprises two or more route segments.

In an additional aspect of the disclosure, a method for determining a route from a mesh network to an external network includes identifying a plurality of route segments from UE to the external network. The route segments comprise at least a first route segment from the UE to a first mesh AP, a second route segment from the first mesh AP to the external network through a wide area cellular wireless network (WACWN), and a third route segment from the first mesh AP to the external network through an alternative network. The method further includes determining respective bandwidth of at least the first, second and third route segments. The method further includes receiving a quality of service (QoS) requirement associated with data between the UE and the external network. The method further includes selecting the route based on the QoS requirement and the bandwidth of the first, second and third route segments, wherein the route comprises at least two of the route segments. The method further includes routing the data between the UE and the external network via the selected route.

In an additional aspect of the disclosure, a non-transitory computer-readable medium having program code recorded thereon includes program code to identify a plurality of route segments from a user equipment (UE) in a mesh network to an external network. The route segments comprise at least a first route segment from the UE to a first mesh access point (AP), a second route segment from the first mesh AP to the external network through a wide area cellular wireless network (WACWN), and a third route segment from the first mesh AP to the external network through an alternative network. The program code includes program code to determine respective bandwidth of at least the first, second and third route segments and program code to select a route based on the bandwidth of the first, second and third route segments, wherein the route comprises at least two of the route segments. The program code includes program code to transmit data between the UE and the external network via the selected route.

In an additional aspect of the disclosure, a non-transitory computer-readable medium having program code recorded thereon includes program code to identify a plurality of route segments from a user equipment (UE) to the external network. The route segments comprise at least a first route segment from the UE to a first mesh access point (AP), a second route segment from the first mesh AP to an external network through a wide area cellular wireless network (WACWN), and a third route segment from the first mesh AP to the external network through an alternative network. The program code includes program code to determine respective bandwidth of at least the first, second and third route segments. The program code includes program code to receive a quality of service (QoS) requirement associated with data between the UE and the external network and program code to select the route based on the QoS requirement and the bandwidth of the first, second and third route segments, wherein the route comprises at least two of the route segments. The program code includes program code to transmit the data between the UE and the external network via the selected route.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well known structures and components are shown in block diagram form in order to avoid obscuring such concepts.

Figure 1:
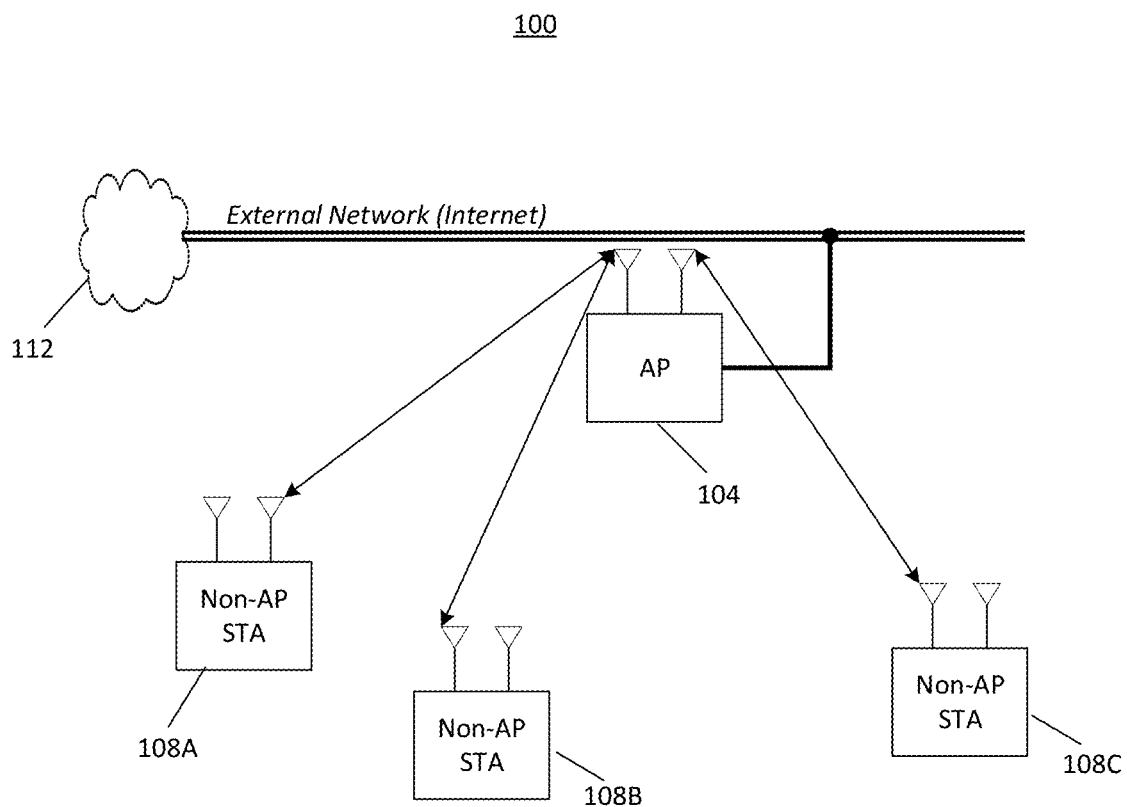
FIG. 1 conceptually illustrates an example of a WLAN.
Figure 2:
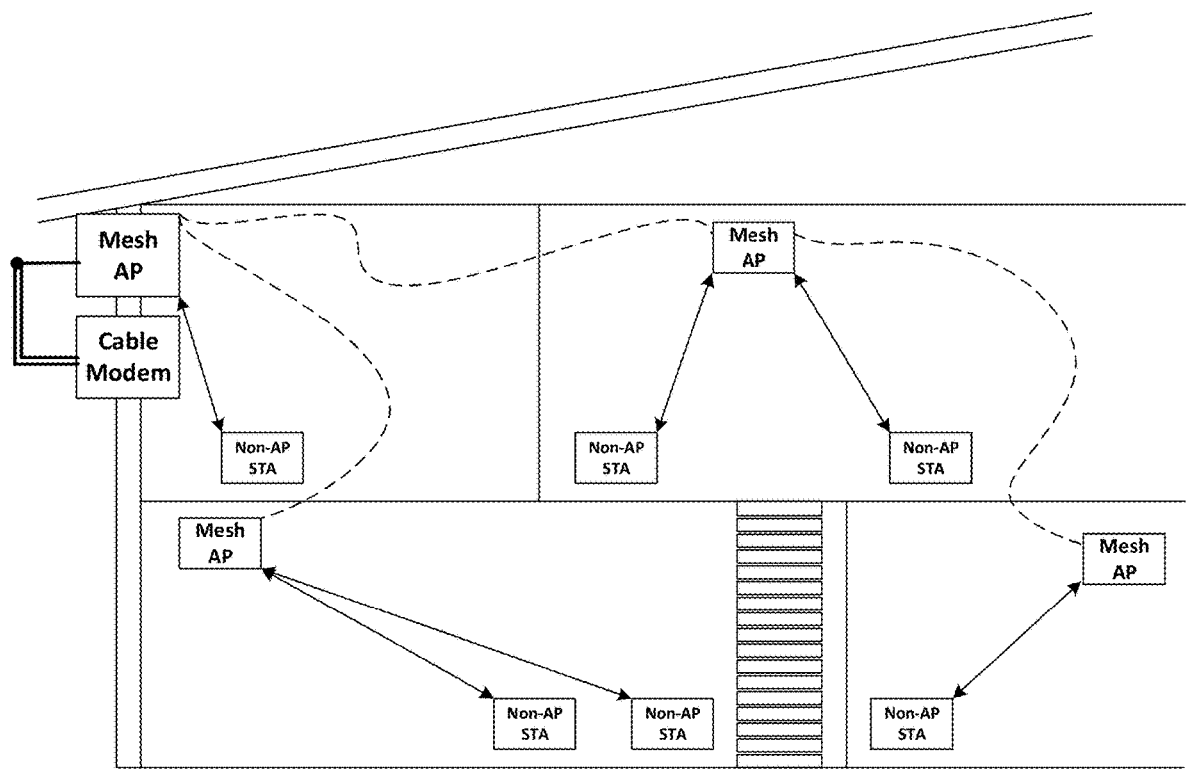
FIGS. 2-3 conceptually illustrate mesh networks.
Figure 3:
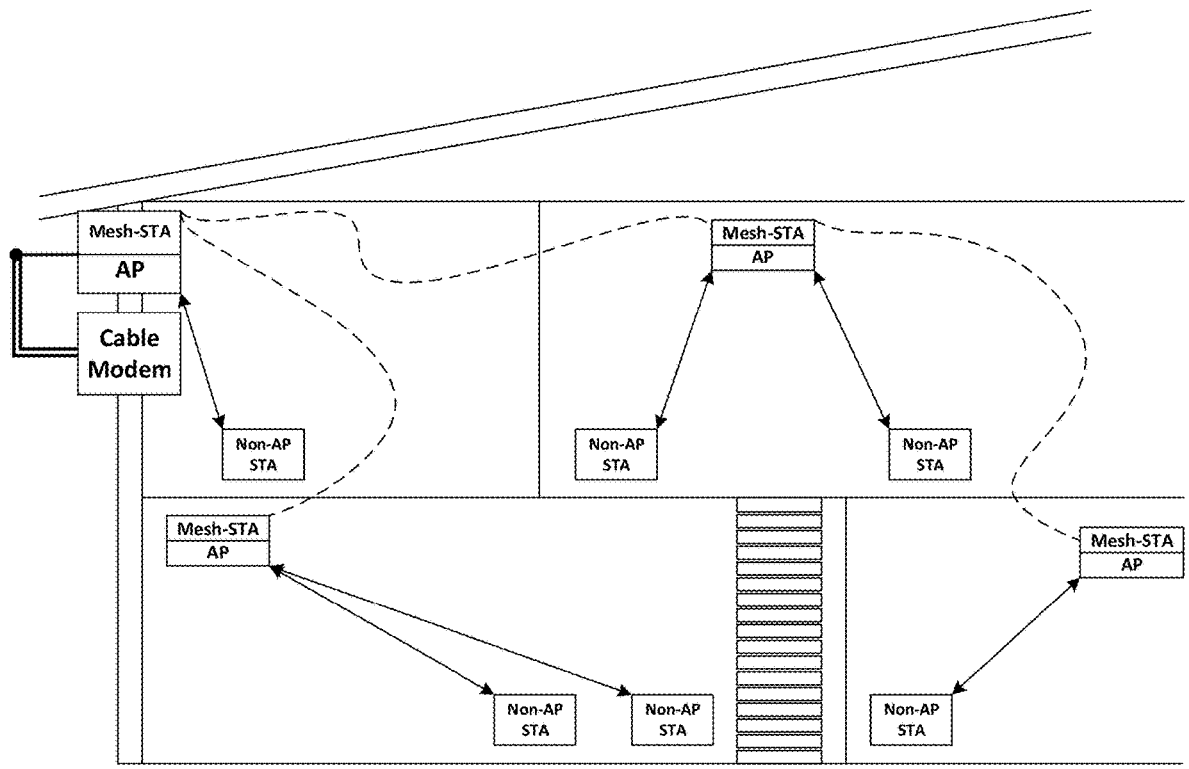
Figure 4A:
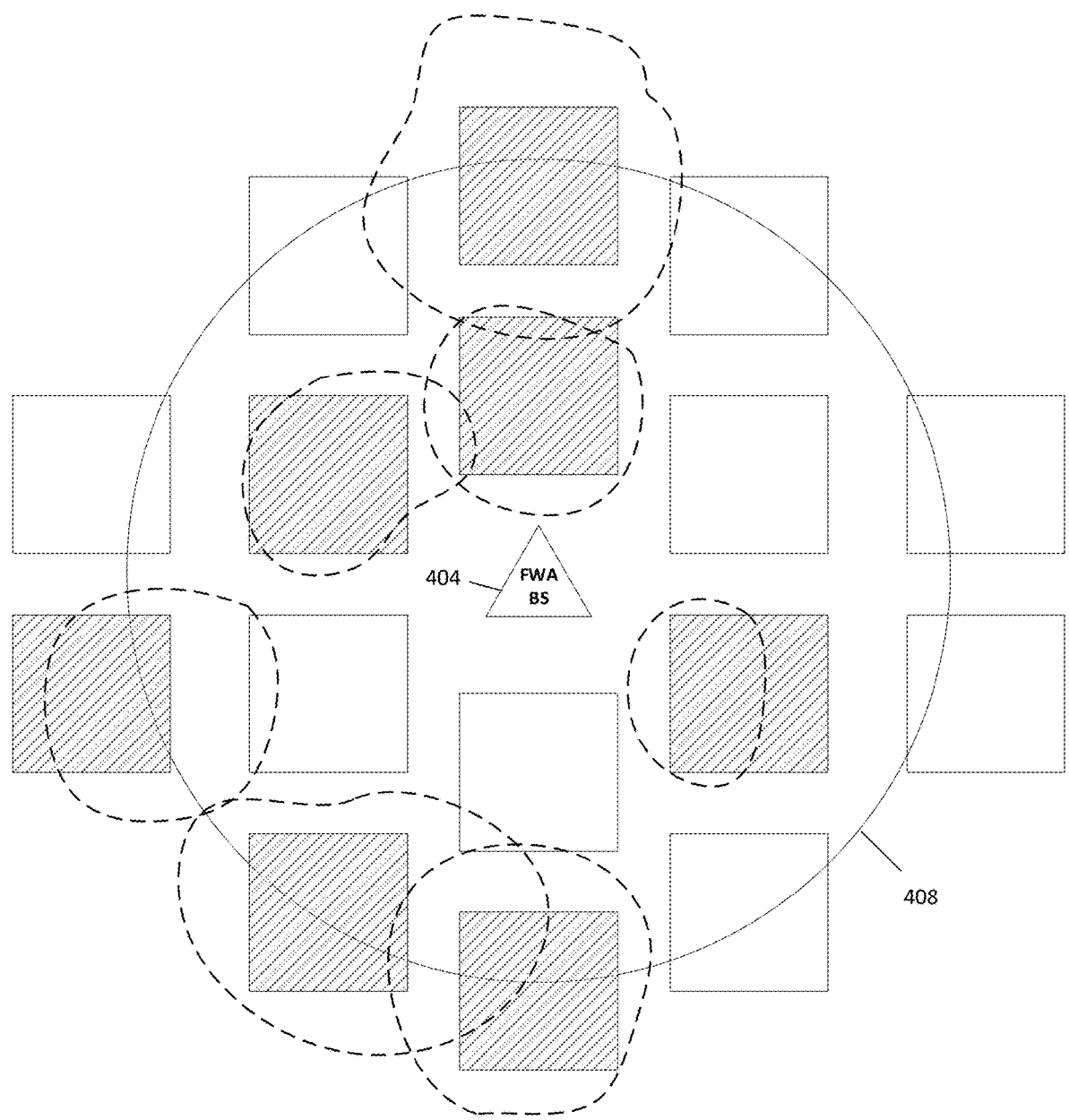
FIG. 4A conceptually illustrates overlapping mesh coverage.
Figure 4B:
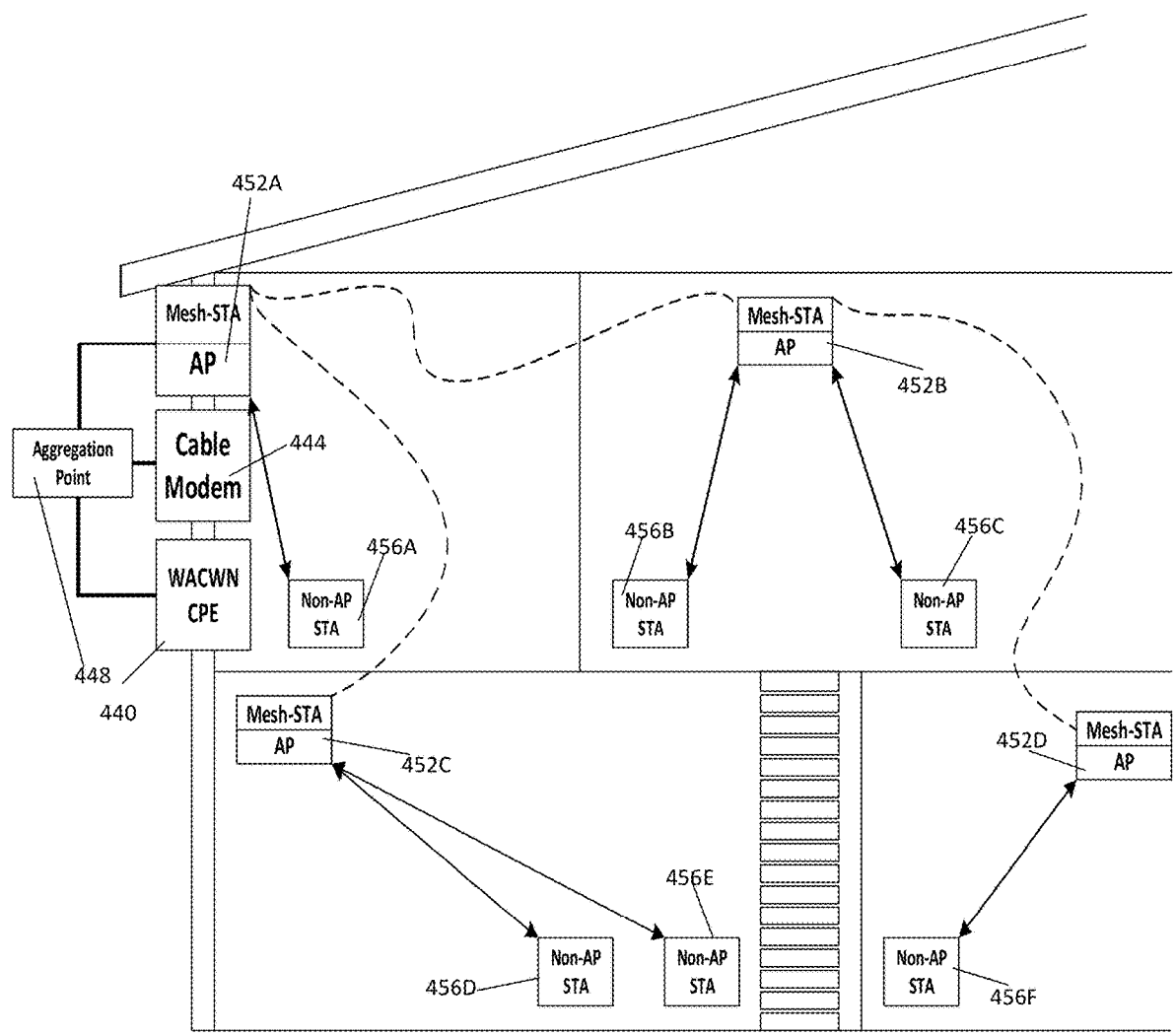
FIG. 4B conceptually illustrates link aggregation.
Figure 5:
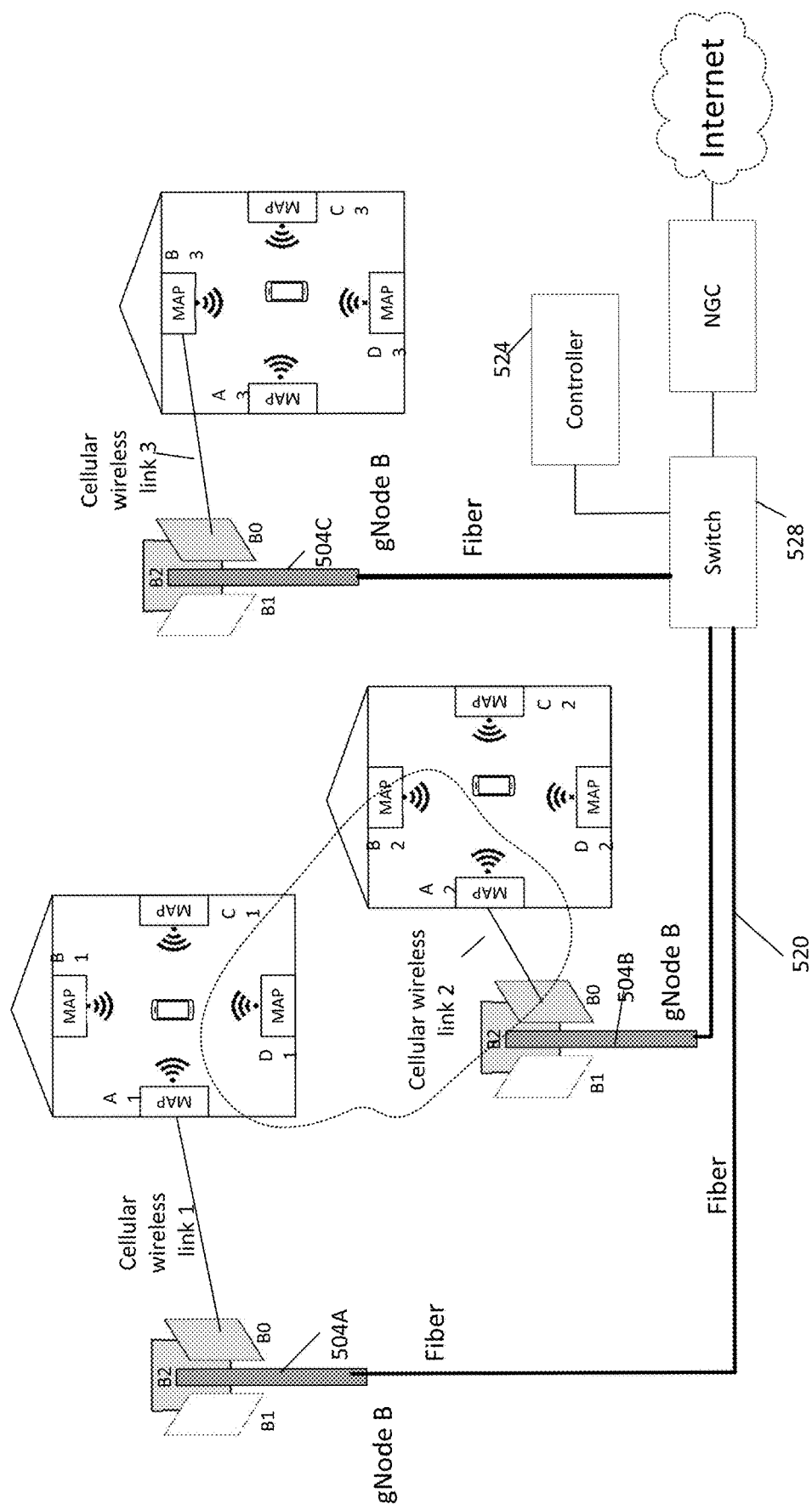
FIGS. 5-6 are block diagrams conceptually illustrating networks for communication.

FIG. 5 is a block diagram conceptually illustrating a wireless network 500 for communication. The wireless network 500 may, for example, be a 4G LTE or a 5G network. The wireless network 500 includes a number of base stations 504A-504C, which are connected to a wide area network such as the Internet via a wired connection 520. The base station 504A communicates with a mesh access point A1 over a cellular wireless link 1, the base station 504B communicates with a mesh access point A2 over cellular wireless link 2, and the base station 504C communicates a mesh access point B3 over cellular wireless link 3. A first mesh network comprises mesh access points A1, B1, C1 and D1, a second mesh network comprises mesh access points A2, B2, C2 and D2, and a third mesh network comprises mesh access points A3, B3, C3 and D3. The mesh access points within a mesh network communicates with each other using mesh wireless links. The spectrum may be shared between the mesh network links and the wide area cellular wireless network (WACWN) links. The mesh networks serve communication devices and UEs such as, for example, smartphones, laptop computers, desktop computers, augmented reality/virtual reality (AR/VR) devices.

Referring to FIG. 5, a central controller 524 is connected to the base stations 504A-504C via a switch 528. The central controller 524 manages, among others, spectrum sharing between the WACWN and the mesh networks. As shown in FIG. 5, the mesh access points D1, A2 and B2 and the WACWN link 2 may interfere with each other. The controller 524 can allocate different orthogonal channels for the wireless link 2 and the mesh access points D1, A2 and B2 to avoid interference. The controller 524 can also implement policy changes in the mesh networks based on channel conditions and loading on the WACWN links.

Although, the mesh access points A1-D1, A2-D2, and A3-D3 are installed in buildings to provide in-building wireless mesh network capability, the mesh access points may be configured to provide wireless mesh network capability inside a moving vehicle such as a car, a bus or a train.

Figure 6:
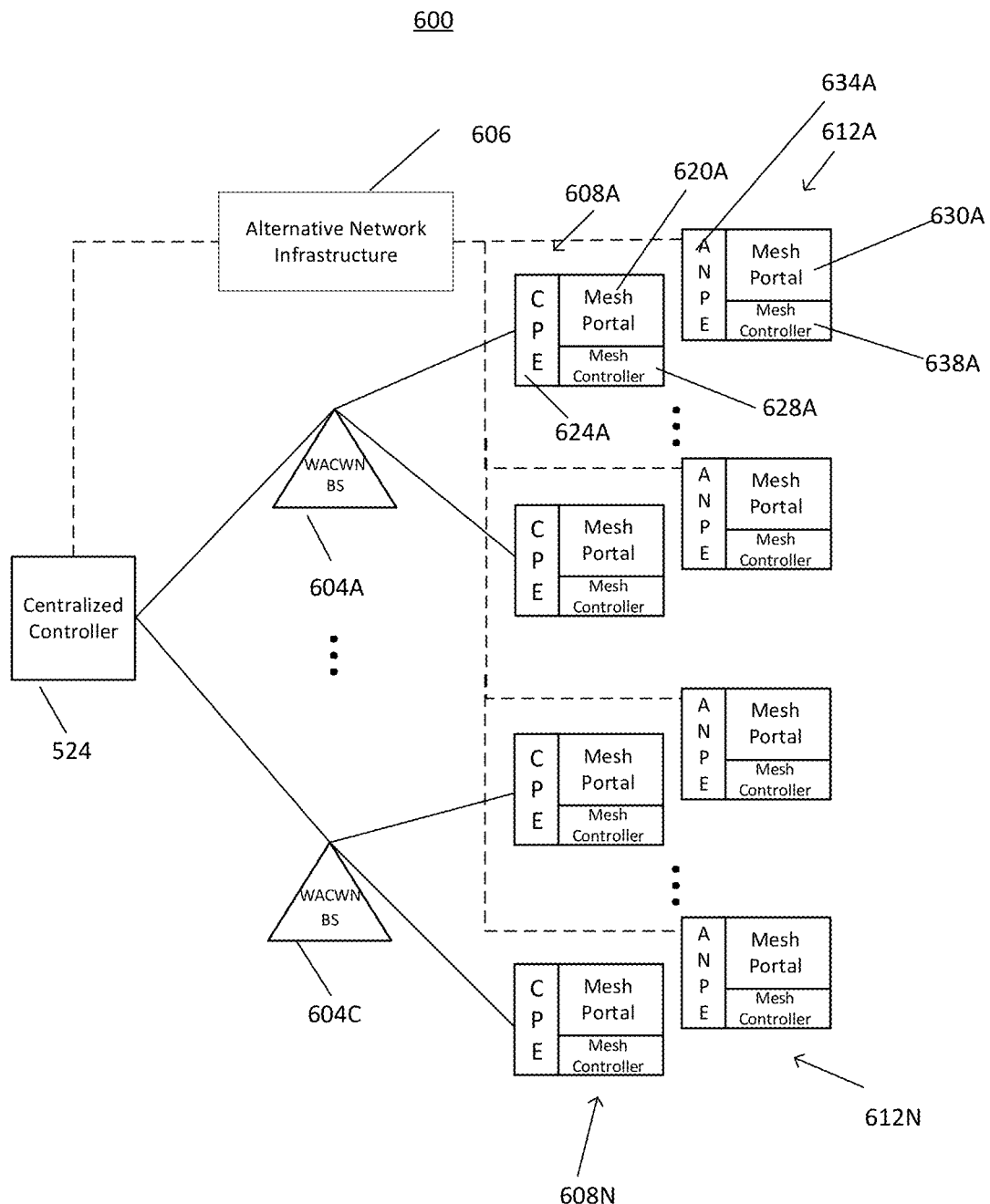

FIG. 6 is a block diagram conceptually illustrating a network 600 in accordance with one aspect of the present disclosure. In the network 600, the central controller 524 manages spectrum sharing between a WACWN, alternative networks, and mesh networks. The WACWN is formed by base stations 604A-604C whereas an alternative network 606 may include, for example, a cable network, a digital subscriber line (DSL), and/or a fiber optic network. The base stations 604A-604C are connected mesh APs 608A-608N through wireless means. The alternative network 606 is connected to alternative network APs (ANAPs) 612A-612N. Connections associated with the WACWN are shown in solid lines whereas connections associated with the alternative network 606 are shown in dashed lines.

Referring to FIG. 6, the central controller 524 assigns or allocates bandwidth and channels to base stations 604A-604C, mesh APs 608A-608N, and the alternative network APs 612-612N. The central controller 524 can implement policy changes in the mesh networks based on channel conditions and loading on the wireless links. The central controller 524 may, for example, be a rack-mounted server which contains software. The central controller 524 may be connected to the base stations 604A-604C via a wired connection.

In one embodiment, the mesh APs 608A-608N include mesh portal devices and CPEs. For example, the mesh AP 608A includes a mesh portal device 620A and a CPE 624A. The CPE 624A may be integrated into the mesh AP 608A, but in some embodiments the CPE 624A may be a separate device. The CPE 624A establishes wireless link with the base station 604A, thereby allowing the mesh portal device 620A to access an external network such as, for example, a 5G or a 4G LTE wireless network. The mesh portal device 620A may include a mesh controller 628A which manages the mesh network.

In one embodiment, the ANAPs 612A-612N include mesh portal devices and alternative network premise equipment (ANPEs). For example, the ANAP 612A includes a mesh portal device 630A and a ANPE 634A. The ANPE 634A may be integrated into the alternative network AP 612A, but in some embodiments the ANPE 634A may be a separate device. The ANPE 634A allows the mesh portal device 630A to access the alternative network 606. The mesh portal device 630A may include a mesh controller 638A which manages the mesh network.

In some embodiments, the alternative network 606 is a cable network connected to a cable modem, where a fiber node and a distribution hub may be co-located with, or integrated into, the cable modem.

In operation, the central controller 524 receives data from the base stations 604A-604C, the mesh APs 608A-608N, and from the ANAPs 612A-612N. The central controller 524 may, for example, receive data relating to wireless link metrics (e.g., signal strength, bit error rate, data throughput, routing information) and may also receive data indicating configuration settings used for the base stations 604A-604C, the mesh APs 608A4608N, and the ANAPs 612A-612N. Based on the data, the central controller 520 can configure the base stations 604A-604C, the mesh APs 608A-608N, and the ANAPs 612A-612N. The central controller 524 may send one or more configuration parameters including link bandwidth, link carrier frequency, transmit power, antenna tilt, and quality of service for different traffic types to the base stations 604A-604C, the mesh APs 608A-608N, and the ANAPs 612A-612N for configuration purposes.

According to disclosed embodiments, the mesh controllers 628A and 638A may be computer program code residing in an embedded system such as, for example, a WLAN radio system on a chip. The central controller 524 may access and manage the mesh controllers 628A and 638A via the base station 604A and the alternative network 606 and may adjust configuration settings to control traffic routes, channel selections, channel bandwidth, and channel power, etc.

According to some disclosed embodiments, bandwidth and channels (e.g., center frequencies) are dynamically assigned or allocated to the Mesh APs in the mesh network. The mesh controllers 628A and 638A, for example, may assign or allocate bandwidth and channels to the Mesh APs based on one or more criteria. For example, the channels may assigned to prevent interference between various link categories that include: link between Mesh AP to UEs (e.g., 802.11 compatible device); link between Mesh AP to Mesh AP (on Mesh Portal and other mesh devices).

According to disclosed embodiments, the central controller 524 may include software contained in a rack-mounted server. The Central Controller 524 may connect to the base station through wired network infrastructure such as a fiber optic network. The central controller 524 may send messages to the base station and a local computer in the base station may configure various WACWN parameters such as, for example, link bandwidth, link carrier frequency, transmit power, antenna tilt, and quality of service for different traffic types.

In one aspect of the present disclosure, the UE can connect to the external network (e.g., the Internet) through the mesh network by having its traffic routed through the base station 604A via the CPE 624A or through the alternative network 606 via the ANPE 634A. If the UE is able to connect to both the base station 604A and the alternative network 606 through the mesh network, the central controller 524 may determine if the UE connects through the base station 604A or through the alternative network 606. The central controller 524 may select between the base station 604A and the alternative network 606 based on one or more metrics including, but not limited to, bandwidth, latency, QoS requirements, and stability.

In one aspect of the present disclosure, the central controller may select a route that has the maximum bandwidth. For example, the central controller may search for routes from the UE to the Internet via each mesh AP through either the CPE or the ANPE and select the route that has the maximum bandwidth.

In one aspect of the present disclosure, the mesh controllers 628A/638A identify a plurality of route segments from UE to the external network. The route segments comprise at least a first route segment from the UE to a first mesh AP, a second route segment from the first mesh AP to the external network through a wide area cellular wireless network (WACWN), and a third route segment from the first mesh AP to the external network through the alternative network 606. The mesh controllers 628A/638A determine respective bandwidth of at least the first, second and third route segments. The mesh controllers 628A/638A select the route based on the bandwidth of the first, second and third route segments, wherein the route comprises at least two of the route segments. The mesh controllers 628A/638A route data between the UE and the external network via the selected route. The aforementioned steps may be performed by the central controller 524 instead of the mesh controllers 628A/638A.

Figure 7:
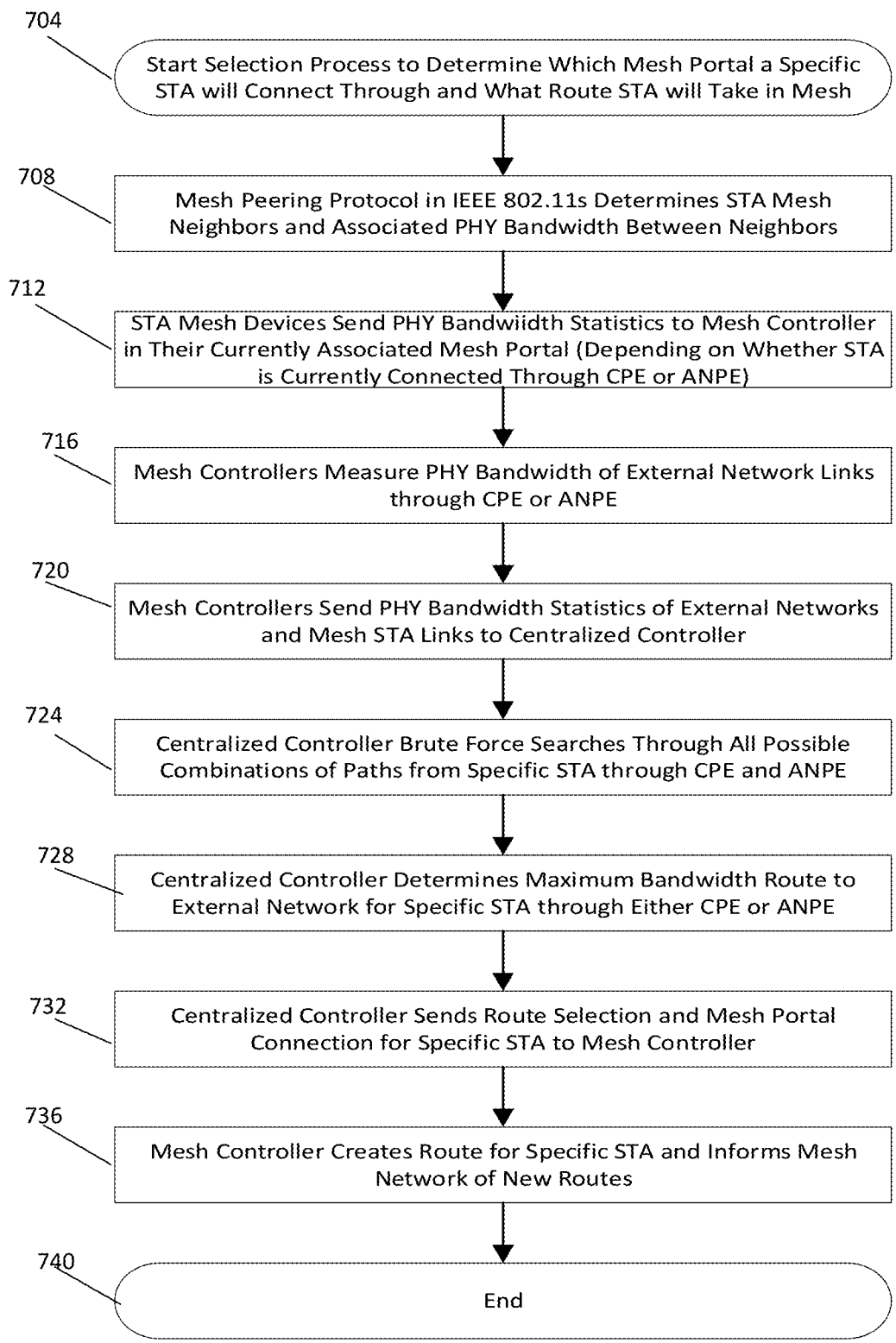
FIGS. 7-9 are functional block diagrams illustrating example blocks executed to implement aspects of the present disclosure.

FIG. 7 is a functional block diagram illustrating example blocks executed to implement one aspect of the present disclosure. More specifically, FIG. 7 shows example blocks executed to determine whether the UE will connect to the external network (e.g., the Internet) through the base station 604A or through the alternative network 606. In various blocks of FIG. 7, in accordance with standards and protocols a "Specific STA" refers to a UE, and a "Mesh STA" refers to a mesh AP.

The flow begins in block 704, and in block 708 a mesh peering protocol determines mesh AP 608A/612A neighbors and physical layer (PHY) bandwidth between the mesh AP neighbors. For example, a mesh peering protocol in IEEE 802.1 may determine mesh APs 608A/612A in the mesh network and associated PHY bandwidth between the mesh APs in the mesh network.

In block 712, the mesh APs 612A in the mesh network send PHY bandwidth data to the mesh controller 628A/638A. For example, the mesh APs 612A may send PHY bandwidth data to the mesh controller.

In block 716, the mesh controllers 628A/638A measure PHY bandwidth of external network links through the CPE 624A or the ANPE 634A. In block 720, the mesh controllers 628A/638A send PHY bandwidth data of external network links and PHY bandwidth data of mesh AP links to the central controller 524.

In block 724, the central controller 524 searches for possible combinations of paths for any UE through either the CPE 624A or the ANPE 634A. The central controller 524 may, for example, search for all possible combinations using a brute force method. In block 728, the central controller 524 determines a maximum bandwidth route to the external network. Using the search result, the central controller 524 may determine a maximum bandwidth route from each mesh AP 608A/612A through either the CPE 624A or the ANPE 634A.

In block 732, the central controller 524 sends route selection and mesh portal connection information for the UEs to the mesh controllers 628A/638A. In block 736, the mesh controllers 628A/638A create routes for the UEs, and the flow ends in block 740.

In one aspect of the present disclosure, the UE can connect to the external network via the base station 604A or via the alternative network 606 depending on wireless interference to neighbor wireless networks. The central controller may select between the base station 604A and the alternative network 606 based on wireless interference to neighbor wireless networks or sensitivity to wireless interference from nearby wireless networks.

Figure 8:
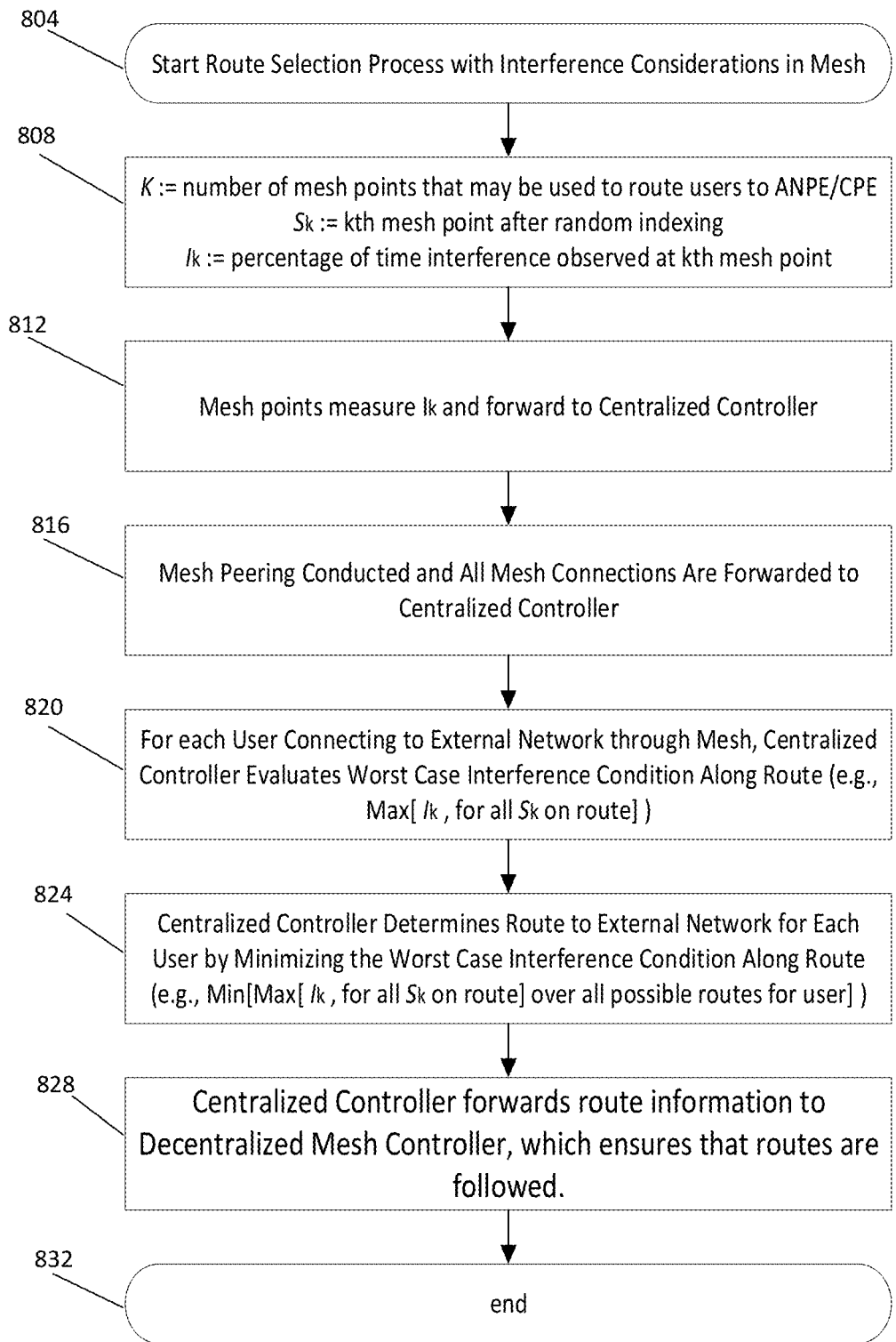

FIG. 8 is a functional block diagram illustrating example blocks executed to implement one aspect of the present disclosure. More specifically, FIG. 8 shows example blocks executed to select route through a radio base station (i.e., WACWN) or through the alternative network based on interference considerations in the mesh network. The flow starts in block 804, and in block 808 the number of mesh APs 608A/612A that may be used to route UEs to ANPE 634A or CPE 624A are enumerated.

In block 812, the mesh controllers 628A/638A measures percentage of time interference is observed at Kth mesh AP and the measurement is forwarded to the central controller 524. In block 816, mesh peering occurs and the mesh controller forwards mesh connection data to the central controller. Generally, mesh APs 608A/612A automatically connect to each other if they can hear each other's transmission and this is referred to as mesh peering. In block 820, for each UE connecting to an external network through the mesh network, the central controller 524 evaluates worst case conditions along the route. The worst case indicates the link in the route with the most interference percentage.

In block 824, the central controller 524 determines a route to an external network for the UEs by minimizing the worst case interference condition along the route. For example, the central controller 524 may find the route where the worst link in terms of interference is better than the worst link in all other routes.

In block 828, the central controller 524 forwards the route information to the mesh controllers 628A/638A which ensures that the routes are followed. The flow ends in block 832.

In one aspect of the present disclosure, the UE may be connected to the external network via the base station 604A or the alternative network 606 depending quality of service (QoS) requirement associated with data. The QoS requirements may, for example, include bandwidth, latency, and network traffic. The central controller may select the base station 604A (i.e., WACWN) or the alternative network 606 as the route based on QoS requirements and for load balancing purposes.

Figure 9:
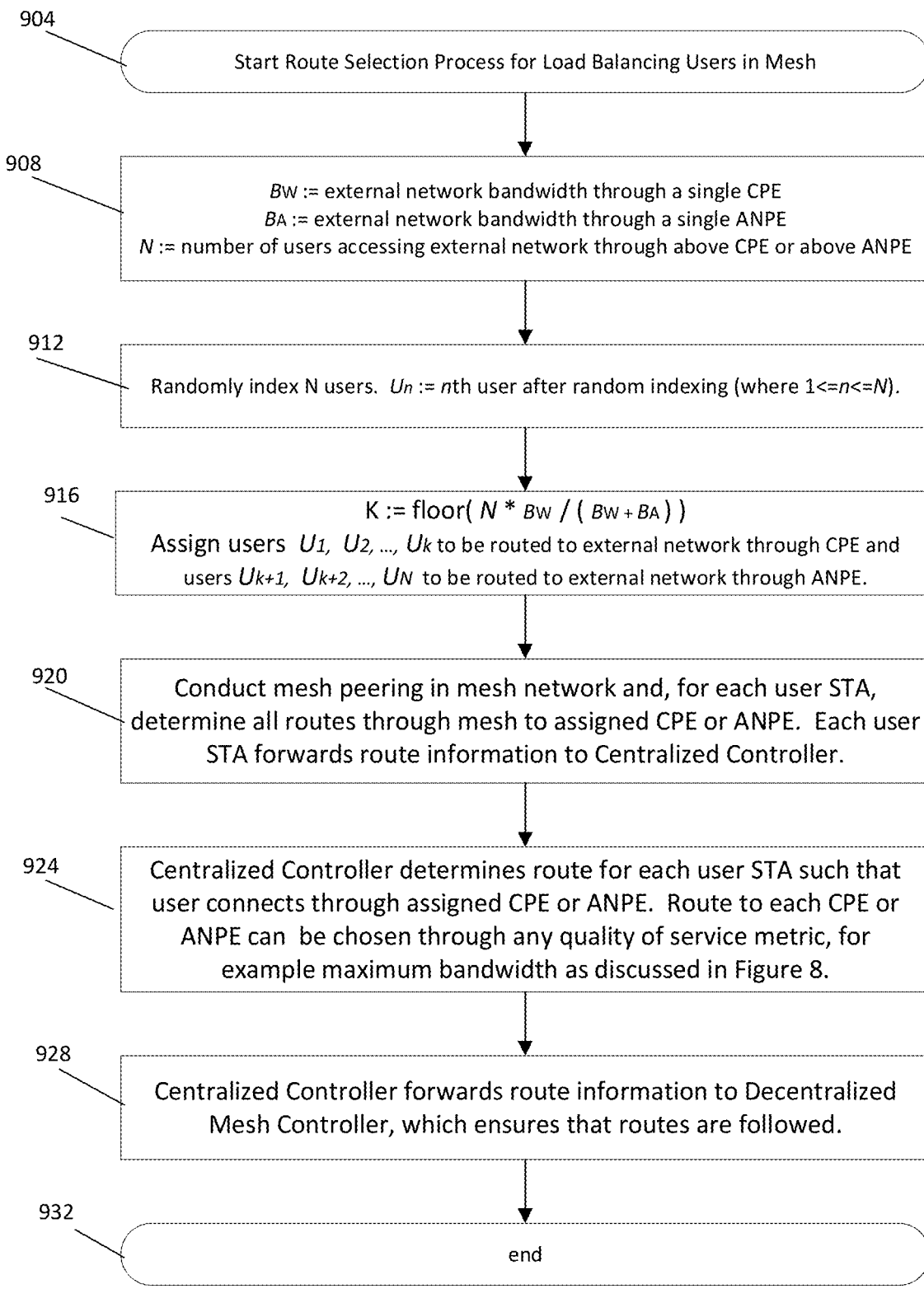

FIG. 9 is a functional block diagram illustrating example blocks executed to implement one aspect of the present disclosure. The process starts in block 904, and in block 908 the mesh controllers 628A/638A initializes an external network bandwidth through a single CPE 624A and an external network bandwidth through a single ANPE 634A and enumerates the number of UEs accessing the external network through the CPE 624A or through the ANPE 634A.

In block 912, the mesh controllers 628A/638A randomly indexes UEs, and in block 916, the central controller 524 assigns U1 to UK users to be routed to the external network through the CPE 624 and assigns UK+1 to UN users to be routed to the external network through the ANPE 634.

In block 920, the mesh APs 608A/612A conduct mesh peering to establish the mesh network and determines routes through the mesh network to the assigned CPE 624 or to the ANPE 634, and the mesh controller forwards the information to the central controller. In block 924, based on the received information, the central controller 524 determines routes for the UEs such that the UEs connect through the assigned CPE 624 or the ANPE 634. The central controller 524 may select route to the CPE 624 or the ANPE 634 depending on, for example, a QoS metric. In block 928 the central controller 524 forwards the route information to the mesh controllers 628/638 which ensures that the routes are followed.

Those of skill would appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above in general terms of their functionality. Whether such functionality is implemented as hardware or software depends upon the particular application and design constraints imposed on the overall system Those of skill may implement the described functionality in varying ways for each particular application, but such implementation decision should not be interpreted as causing a departure from the scope of the present disclosure.

The various illustrative logical blocks, modules and circuits described in connection with the disclosure herein may be implemented or performed with a general purpose processor, a digital signal processor (DSP), an application specific integrated circuit (ASIC), a field programmable gate array (FPGA), or other programmable logic device, transistor logic, discrete hardware components, or any combination thereof designed to perform the functions described herein. A general purpose processor may be a microprocessor, a controller, a microcontroller or a state machine.

The steps of a method or algorithm described in connection with the disclosure herein may be embodied in hardware, in a software module executed by a processor or in a combination of the two. A software module may reside in RAM memory, flash memory, ROM memory, EPROM memory, registers, hard disk, a removable disk, a CD-ROM, or any other form of storage known in the art. An exemplary storage medium is coupled to the processor such that the processor can read information from, and write information to, the storage medium. In the alternative, the storage medium may be integral to the processor. The processor and the storage medium may reside in an ASIC, or the processor and the storage medium may reside in discrete components.

In one or more exemplary designs, the functions described may be implemented in hardware, software, firmware, or any combination thereof. If implemented in software, the functions may be stored on or transmitted over as one or more instructions or code on a computer-readable medium. Computer-readable medium includes both non-transitory computer storage media and communication media including any medium that facilitates transfer of a computer program from one location to another. A non-transitory storage media may be any available media that can be accessed by a general purpose or special purpose computer. By way of example, and not limitation, such non-transitory computer readable media can comprise RAM, ROM, EEPROM, CD-ROM, optical disk storage, magnetic disk storage, DVD, or any other medium that can be used to store program code means in the form of instructions or data structures and that can be accessed by a general purpose or special purpose processor. Any connection is termed a computer-readable medium. If the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk, as used herein, includes CD, laser disc, optical disc, DVD, floppy disk and other disks that reproduce data.

The previous description of disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and features disclosed herein.

What is claimed is:

1. A method for determining a route from a user equipment (UE) in a wireless mesh network to an external network, comprising:
   identifying a plurality of route segments from the UE to the external network, wherein the route segments comprise at least a first wireless route segment from the UE to a first mesh access point (AP), a second wireless route segment from the first mesh AP to the external network through a wide area cellular wireless network (WACWN), and a third route segment from the first mesh AP to the external network through an alternative network, wherein the alternative network is a wired network;

determining respective bandwidth of at least the first, second and third route segments;

selecting the route based on the bandwidth of the first, second and third route segments, wherein the route comprises at least two of the route segments; and routing data between the UE and the external network via the selected route.

2. The method of claim 1, further comprising:

determining physical layer bandwidth of at least the first, second and third route segments;

selecting the route that has the maximum bandwidth from the UE to the external network, wherein the route comprises two or more route segments.

3. The method of claim 1, wherein the route segments comprise a fourth route segment from the first mesh AP to a second mesh AP.

4. The method of claim 1, wherein the external network is the internet.

5. The method of claim 1, wherein the alternative network is a cable network.

6. The method of claim 1, wherein the alternative network is a digital subscriber line (DSL).

7. The method of claim 1, wherein the alternative network is a fiber optic network.

8. The method of claim 1, wherein the physical layer bandwidth is determined by mesh peering.

9. The method of claim 1, further comprising:

receiving at a central controller data indicating the respective bandwidth of the route segments; and determining, by the central controller, the route based on the bandwidth of the route segments.

10. A method for determining a route from a user equipment (UE) in a wireless mesh network to an external network, comprising:

identifying a plurality of route segments from the UE to the external network, wherein the route segments comprise at least a first wireless route segment from the UE to a first mesh access point (AP), a second wireless route segment from the first mesh AP to the external network through a wide area cellular wireless network (WACWN), and a third route segment from the first mesh AP to the external network through an alternative network, wherein the alternative network is a wired network;

determining respective bandwidth of at least the first, second and third route segments;

receiving a quality of service (QoS) requirement associated with data between the UE and the external network;

selecting the route based on the QoS requirement and the bandwidth of the first, second and third route segments, wherein the route comprises at least two of the route segments; and routing the data between the UE and the external network via the selected route.

11. The method of claim 10, wherein the QoS requirement associated with the data indicates a minimum required bandwidth.

12. The method of claim 10, wherein the QoS requirement associated with the data indicates a latency.

13. The method of claim 10, wherein the route segments comprise a fourth route segment from the first mesh AP to a second mesh AP.

14. The method of claim 10, wherein the external network is the internet.

15. The method of claim 10, wherein the alternative network is a cable network.

16. The method of claim 10, wherein the alternative network is a digital subscriber line (DSL).

17. The method of claim 10, wherein the alternative network is a fiber optic network.

18. A non-transitory computer-readable medium having program code recorded thereon, the program code comprising:

program code to identify a plurality of route segments from a user equipment (UE) in a wireless mesh network to an external network, wherein the route segments comprise at least a first wireless route segment from the UE to a first mesh access point (AP), a second wireless route segment from the first mesh AP to the external network through a wide area cellular wireless network (WACWN), and a third route segment from the first mesh AP to the external network through an alternative network, wherein the alternative network is a wired network;

program code to determine respective bandwidth of at least the first, second and third route segments;

program code to select a route based on the bandwidth of the first, second and third route segments, wherein the route comprises at least two of the route segments; and program code to transmit data between the UE and the external network via the selected route.

19. A non-transitory computer-readable medium having program code recorded thereon, the program code comprising:

program code to identify a plurality of route segments from a user equipment (UE) to an external network, wherein the route segments comprise at least a first wireless route segment from the UE to a first mesh access point (AP), a second wireless route segment from the first mesh AP to an external network through a wide area cellular wireless network (WACWN), and a third route segment from the first mesh AP to the external network through an alternative network, wherein the alternative network is a wired network;

program code to determine respective bandwidth of at least the first, second and third route segments;

program code to receive a quality of service (QoS) requirement associated with data between the UE and the external network;

program code to select the route based on the QoS requirement and the bandwidth of the first, second and third route segments, wherein the route comprises at least two of the route segments; and program code to transmit the data between the UE and the external network via the selected route.

* * * * *